United States Patent
Ohta et al.

(10) Patent No.: US 8,432,488 B2
(45) Date of Patent: Apr. 30, 2013

(54) VIDEO PROCESSING APPARATUS AND VIDEO PROCESSING METHOD

(75) Inventors: Yoshihito Ohta, Osaka (JP); Katsuyuki Arimoto, Okayama (JP)

(73) Assignee: Panasonic Corporation, Osaka (JP)

( * ) Notice: Subject to any disclaimer, the term of this patent is extended or adjusted under 35 U.S.C. 154(b) by 1 day.

(21) Appl. No.: 13/258,631

(22) PCT Filed: Apr. 9, 2010

(86) PCT No.: PCT/JP2010/002619
§ 371 (c)(1),
(2), (4) Date: Sep. 22, 2011

(87) PCT Pub. No.: WO2010/122726
PCT Pub. Date: Oct. 28, 2010

(65) Prior Publication Data
US 2012/0013797 A1    Jan. 19, 2012

(30) Foreign Application Priority Data
Apr. 23, 2009  (JP) .................. 2009-104958

(51) Int. Cl.
*H04N 7/01* (2006.01)
(52) U.S. Cl.
USPC ............................ 348/441; 348/452; 348/459
(58) Field of Classification Search .................. 348/441, 348/443, 446, 448, 449, 451, 452, 458, 459, 348/699; 375/240.16; *H04N 7/01, 11/20*
See application file for complete search history.

(56) References Cited

U.S. PATENT DOCUMENTS

| 4,933,765 | A | 6/1990 | Schiff et al. | |
| RE40,074 | E * | 2/2008 | Butler et al. | 348/447 |
| 2001/0017889 | A1 | 8/2001 | Borer | |
| 2009/0184916 | A1 | 7/2009 | Miyazaki et al. | |
| 2009/0208137 | A1 | 8/2009 | Urushihara et al. | |
| 2010/0013991 | A1 | 1/2010 | Miyazaki et al. | |
| 2010/0033620 | A1 * | 2/2010 | Hoshino et al. | 348/441 |
| 2010/0034272 | A1 | 2/2010 | Miyazaki et al. | |

FOREIGN PATENT DOCUMENTS

| EP | 0 909 092 | 4/1999 |
| JP | 4-500590 | 1/1992 |
| JP | 11-513541 | 11/1999 |
| JP | 2005-150897 | 6/2005 |
| JP | 2007-288681 | 11/2007 |
| JP | 4083265 | 2/2008 |
| JP | 2009-194843 | 8/2009 |
| WO | 2008/102826 | 8/2008 |

OTHER PUBLICATIONS

International Search Report issued Jun. 22, 2010 in International (PCT) Application No. PCT/JP2010/002619.

* cited by examiner

*Primary Examiner* — Sherrie Hsia
(74) *Attorney, Agent, or Firm* — Wenderoth, Lind & Ponack, L.L.P.

(57) ABSTRACT

A video processing apparatus for converting frame rates of video signals includes: a video characteristic detection unit (29) that detects, from an input video signal, as characteristics of the video signal, whether or not the video signal is of a film material and/or whether or not character information is displayed in the video signal; and an interpolation phase calculation unit (21) to a merge unit (28) that constitute an image generation unit that uses the characteristics detected by the video characteristic detection unit, to generate an intermediate frame image having a phase different from the phase of an input frame image of the video signal. In accordance with the characteristics detected by the characteristic detection unit, the image generation unit moves the phase of the intermediate frame image to a phase different from a logical interpolation phase determined based on an input frame frequency and an output frame frequency.

10 Claims, 9 Drawing Sheets

VIDEO PROCESSING APPARATUS AND VIDEO PROCESSING METHOD

TECHNICAL FIELD

The present invention relates to a video processing apparatus and a video processing method that perform a frame rate conversion process for converting frame rates of video signals. More particularly, the present invention relates to a video processing apparatus and a video processing method for performing a dejudder process on a cinema video.

BACKGROUND ART

Because a 24-Hz video such as a cinema video cannot be displayed as-is by a display device displaying a 60 Hz video, conventional technologies perform a frame rate conversion process where a video such as a movie film having images recorded at 24 frames per second is converted into a video signal containing 30 frames per second (60 fields) which is used in TV broadcasting.

Examples of such frame rate conversion process include an image processing apparatus disclosed in Patent Document 1, which detects a motion vector by frames n−1, n with the narrowest inter-frame distance among combinations of 2-frames sandwiching an interpolation frame, to associate the motion vector with pixels of the interpolation frame. In the case where there remain pixels with which no motion vector can be associated, two frames, at least either one of which differs from the 2-frames above (e.g., frames n−2, n+1 whose inter-frame distance is wider than that of the frames n−1, n), are used to detect the motion vector, which is associated with the pixels of the interpolation frame. In the case where there still remain pixels with which no motion vector can be associated, two-frames, at least either one of which differs from the 2-frames above (e.g., frames n−3, n+2 whose inter-frame distance is wider than that of the frames n−2, n+1), are used to detect the motion vector, which is associated with the pixels of the interpolation frame. This image processing apparatus can prevent deterioration of the image quality of the interpolation frame by associating motion vectors with as many pixels of an interpolation frame as possible.

Another example of the frame rate conversion process is a video signal system conversion device disclosed in Patent Document 2. A conventional video processing apparatus typified by Patent Document 2 performs frame rate conversion by using a motion vector detection unit and motion vector processing unit. Next is described a process where the conventional video processing apparatus converts a so-called cinema video having a 24-Hz input frame frequency, into a video having a 60-Hz output frame frequency.

Figure 8:
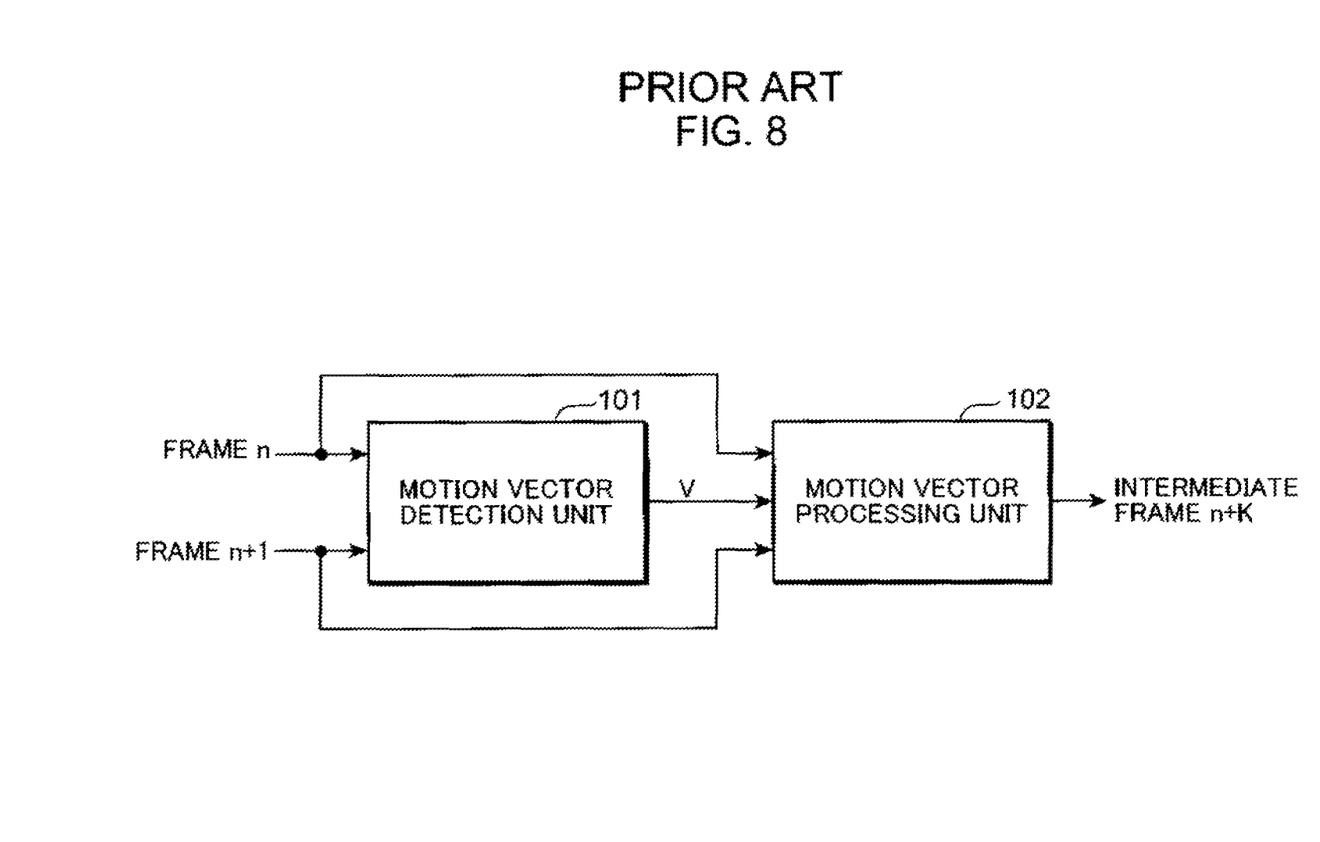
FIG. 8 is a block diagram showing a configuration of a conventional video processing apparatus performing frame rate conversion.
Figure 9:
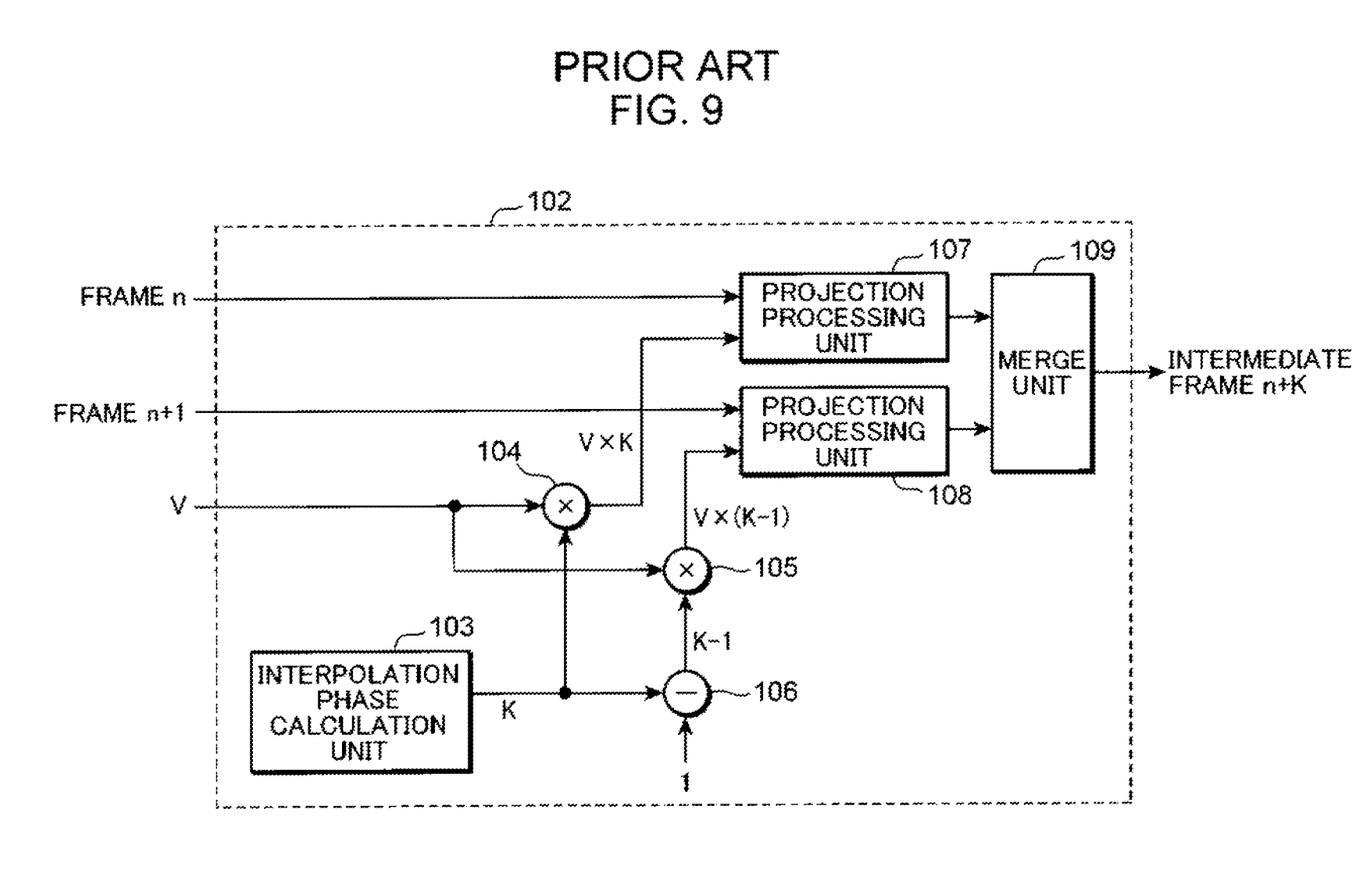
FIG. 9 is a block diagram showing a configuration of a motion vector processing unit shown in FIG. 8.

FIG. 8 is a block diagram showing a configuration of a conventional video processing apparatus that performs frame rate conversion. FIG. 9 is a block diagram showing a configuration of a motion vector processing unit shown in FIG. 8.

In the conventional video processing apparatus shown in FIG. 8, a frame rate conversion process is executed using a motion vector detection unit 101 and motion vector processing unit 102. More specifically, the motion vector detection unit 101 uses image data of a continuous input frame n and image data of an input frame n+1, to detect a motion amount between these frames, and detect a motion vector V on a pixel to pixel basis or a block to block basis. The motion vector processing unit 102 generates image data of an intermediate frame n+K (where K represents an interpolation phase coefficient, and $0 \leq K < 1$) by using the motion vector, the image data of the input frame n and the image data of the input frame n+1.

As shown in FIG. 9, the motion vector processing unit 102 has an interpolation phase calculation unit 103, multipliers 104, 105, subtracter 106, projection processing units 107, 108, and merge unit 109. First, the interpolation phase calculation unit 103 adds the result of a calculation, input frame frequency/output frame frequency (=24/60=0.4), for each processes, and obtains the fractional portion thereof as the interpolation phase coefficient K.

Here, the value 0.4 is added sequentially to an initial value 0.0 and so on to obtain the results 0.0, 0.4, 0.8, 1.2, 1.6, 2.0, . . . and the like. The interpolation phase coefficients K obtained as the fractional portions of these results are 0.0, 0.4, 0.8, 0.2, 0.6, 0.0, and these five patterns are repeated. In addition, control is performed such that the input frame is switched sequentially when the integer portions of the added results above are changed.

The motion vector V detected by the motion vector detection unit 101 applies when the inter-frame distance is 1.0. Therefore, when generating the image data of the intermediate frame n+K by performing a projection process based on the image data of the input frame n, the motion vector V is multiplied by the interpolation phase coefficient K, to perform a gain process. Similarly, when generating the image data of the intermediate frame n+K by performing the projection process based on the image data of the input frame n+1, the motion vector V is multiplied by −(1−K)=K−1, to perform the gain process. The symbols change in this case because the images are projected in a direction of going against the time from the input frame n+1.

As described above, the image data of the input frame n and the image data of the input frame n+1 are subjected to the projection process by the projection processing units 107, 108, to generate intermediate frame videos of these image data. These intermediate frame videos are merged accordingly by the merge unit 109, and the image data of the intermediate frame n+K are eventually output.

More specifically, in case of converting a frame rate from 24 Hz to 60 Hz, when sample phases on a time axis of a frame image to be input are 0.0, 1.0, 2.0, 3.0 and the like, interpolation phases on a time axis of a frame image to be output are 0.0, 0.4, 0.8, 1.2, 1.6, 2.0 and the like. A phase interval of these interpolation phases is 0.4 and determined by the calculation, input frame frequency/output frame frequency, which is 24/60 in this example. The motion vector processing unit 102 multiplies the motion vector V by each of the interpolation phase coefficients K, which are the fractional portions (0.0, 0.4, 0.8, 0.2, 0.6, . . . ) of the interpolation phases, projects the image data of the input frames onto the interpolation phases, to generate the image data of each intermediate frame.

The frame rate conversion process described above, so-called cinema smoothing process (a cinema video dejudder process), has the effect of converting a jumpy movement (judder) of a 24-Hz video (cinema video) into a smooth movement and is installed in the recent TV devices. This conventional cinema smoothing process is effective in relatively slow videos or videos in which the entire screens moves in the same direction.

However, for a video having a plurality of objects moving relatively fast in different directions on the screen, the conventional cinema smoothing process often damages a generated intermediate frame video due to various reasons. This video damage occurs as a result of an error in detecting a motion vector in the vicinity of a border between the objects, an error in detecting a motion vector of an object moving at high speed, and other errors in detecting motion vectors.

Resolving these errors in detecting motion vectors is extremely difficult and consumes resources to resolve these problems.

Patent Document 1: Japanese patent application Publication No. 2007-288681

Patent Document 2: Japanese patent Publication No. 4083265

SUMMARY OF THE INVENTION

An object of the present invention is to provide a video processing apparatus and a video processing method that are capable of using simple configurations to prevent damage to an intermediate frame video obtained after frame rate conversion.

A video processing apparatus according to an aspect of the present invention is a video processing apparatus for converting frame rates of video signals, having: a characteristic detection unit that detects, from an input video signal, as characteristics of the video signal, whether or not the video signal is of a film material and/or whether or not character information is displayed in the video signal; and an image generation unit that uses the characteristics detected by the characteristic detection unit, to generate an intermediate frame image having a phase different from a phase of an input frame image of the video signal, wherein, in accordance with the characteristics detected by the characteristic detection unit, the image generation unit moves the phase of the intermediate frame image to a phase different from a logical interpolation phase determined based on an input frame frequency and an output frame frequency.

A video processing method according to another aspect of the present invention is a video processing method for converting frame rates of video signals, having: a first step of detecting, from an input video signal, as characteristics of the video signal, whether or not the video signal is of a film material and/or whether or not character information is displayed in the video signal; and a second step of generating an intermediate frame image having a phase different from a phase of an input frame image of the video signal, by using the characteristics detected in the first step, wherein in the second step, in accordance with the characteristics detected in the first step, the phase of the intermediate frame image is moved to a phase different from a logical interpolation phase determined based on an input frame frequency and an output frame frequency.

With the configurations described above, it becomes difficult for a user to detect a damage caused in the intermediate frame image generated as an output frame image, preventing damage to an intermediate frame video obtained after frame rate conversion, by means of simple configurations.

BEST MODE FOR CARRYING OUT THE INVENTION

Figure 1:
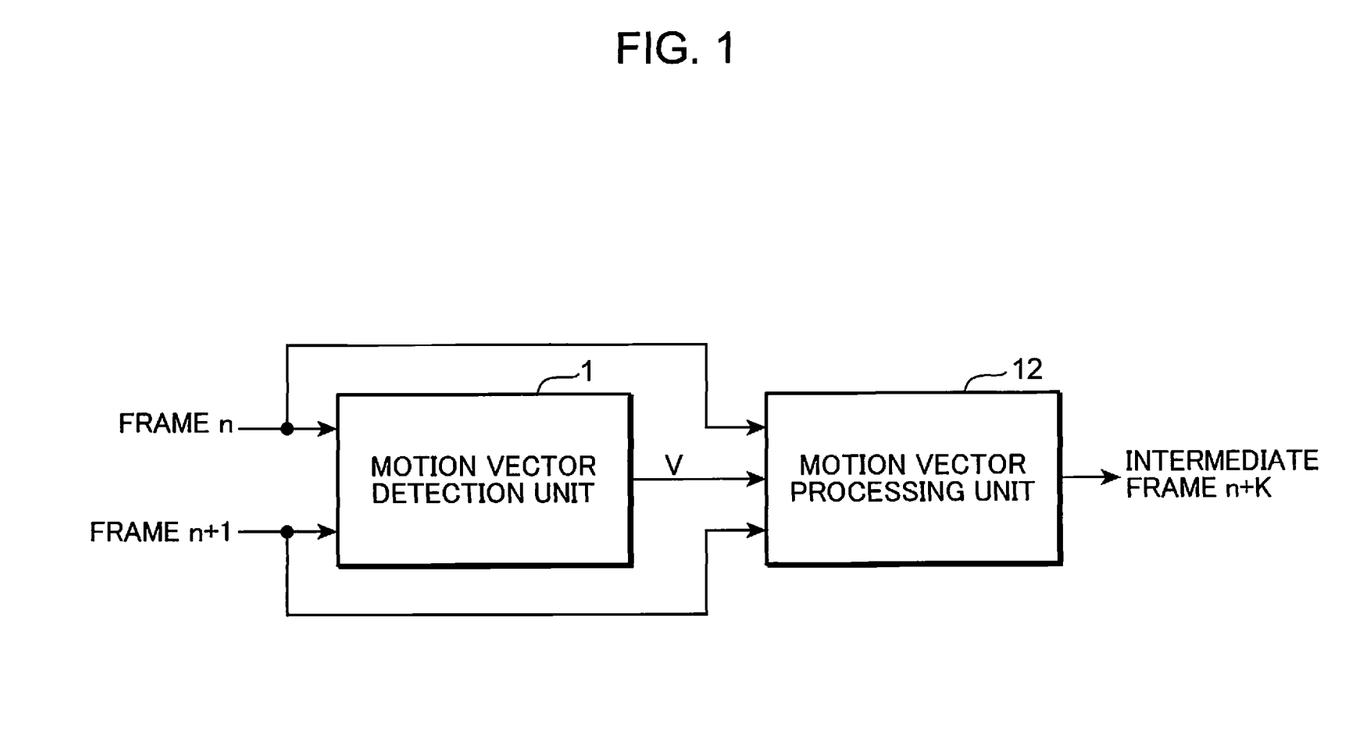
FIG. 1 is a block diagram showing a configuration of a video processing apparatus according to an embodiment of the present invention.
Figure 2:
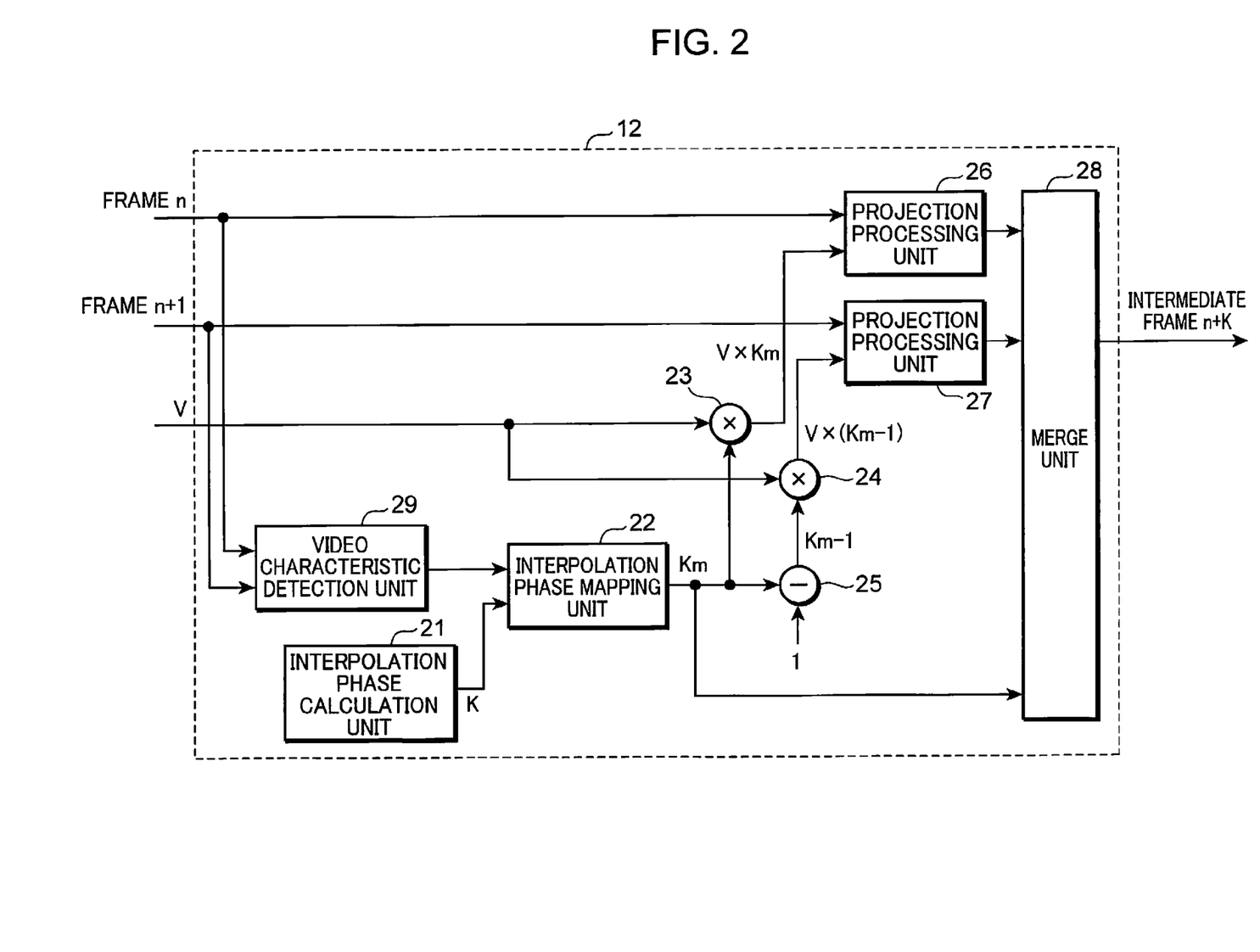
FIG. 2 is a block diagram showing a configuration of a motion vector processing unit shown in FIG. 1.

A video processing apparatus according to an embodiment of the present invention is described hereinafter with reference to the drawings. FIG. 1 is a block diagram showing a configuration of the video processing apparatus according to the embodiment of the present invention. FIG. 2 is a block diagram showing a configuration of a motion vector processing unit shown in FIG. 1.

As shown in FIG. 1, the video processing apparatus according to the present embodiment has a motion vector detection unit 1 and motion vector processing unit 12. As shown in FIG. 2, the motion vector processing unit 12 has an interpolation phase calculation unit 21, interpolation phase mapping unit 22, multipliers 23, 24, subtracter 25, projection processing units 26, 27, merge unit 28, and video characteristic detection unit 29. The video characteristic detection unit 29 corresponds to an example of the characteristic detection unit, and the interpolation phase calculation unit 21, the interpolation phase mapping unit 22, the multipliers 23, 24, the subtracter 25, the projection processing units 26, 27, and the merge unit 28 correspond to an example of the image generation unit. The motion vector detection unit 1 corresponds to an example of a motion amount detection unit, and the interpolation phase calculation unit 21 to an example of a coefficient generation unit. The interpolation phase mapping unit 22 corresponds to an example of a coefficient correction unit, and the multipliers 23, 24, the subtracter 25, the projection processing units 26, 27 and the merge unit 28 correspond to an example of a generation unit.

The video processing apparatus shown in FIG. 1 is used in image display devices such as a liquid crystal display device, plasma display device, and organic EL display device, as well as video recording/reproducing devices such as a VTR, DVD recorder, and blu-ray disc recorder. For example, the video processing apparatus performs the frame rate conversion process where a 60-Hz input video signal is subjected to a frame internal process using motion vector information and converted into a 120-Hz video signal, or a cinema video dejudder process where a so-called cinema video originally having a 24-Hz frame frequency is pulled down into a 60-Hz video signal input, which is subjected to a frame internal process using motion vector information and converted into a video having 120-Hz or 60-Hz output frame frequency.

Temporally successive two input frame images, or image data of an input frame n and image data of an input frame n+1, are input as video signals from an outer or inner predetermined circuit to the motion vector detection unit 1. The motion vector detection unit 1 detects a motion amount between these frames and detects a motion vector V on a pixel to pixel basis or a block to block basis. A well-known motion vector detection method is used as this motion vector detection method, examples of which include a detection method using a matching process performed on a block to block basis.

Note that a motion amount of an image used in the present invention is not limited to the motion vector described above, and various motion amounts apply as long they are detected using at least two or more temporally successive input frame images. Motion amounts in a pan direction in the entire screen and the like may be used.

The motion vector processing unit 12 uses the motion vector V, the image data of the input frame n and the image data of the input frame n+1, to generate image data of an intermediate frame n+K (K represents a logical interpolation phase coefficient, and $0 \leq K < 1$) that has a phase different from a logical interpolation phase that is determined from a phase interval obtained by dividing an input frame frequency by an output frame frequency. According to the results of an experiment performed by the inventors of the present application, a user cannot visibly detect a damage that is caused in a video due to an error in detecting vector information, when the phase of the intermediate frame n+K is close to an integer. In other words, when the phase of the intermediate frame is close to an integer, that is, when the logical interpolation phase coefficient K ($0 \leq K < 1$) is quite far from 0.5, a damage to an intermediate frame video cannot be detected easily.

From the image data of the input frame n and the image data of the input frame n+1, the video characteristic detection unit 29 detects, as characteristics of a video signal, whether or not the video signal is of a film material and/or whether or not character information is displayed in the video signal. The interpolation phase calculation unit 21 generates, as the logical interpolation phase coefficient K, a fractional portion of an interpolation phase that is determined from the phase interval obtained by dividing the input frame frequency by the output frame frequency. The interpolation phase mapping unit 22 performs mapping computation so as to bring the interpolation phase close to an integer phase, corrects the logical interpolation phase coefficient K generated by the interpolation phase calculation unit 21, in accordance with the characteristics of the input image that are detected by the video characteristic detection unit 29 such that the phase of the intermediate frame n+K approaches the phase of the input frame n or the input frame n+1, and generates a corrected interpolation phase coefficient Km.

The multiplier 23 multiplies the motion vector V by the corrected interpolation phase coefficient Km, and the projection processing unit 26 performs a projection process on the image data of the input frame n by using V×Km, to generate the image data of the intermediate frame. The subtracter 25 subtracts 1 from the corrected interpolation phase coefficient Km. The multiplier 24 multiplies the motion vector V by (Km−1). The projection processing unit 27 performs the projection process on the image data of the frame n+1 by using the V×(Km−1), to generate the image data of the intermediate frame. The merge unit 28 appropriately merges thus obtained image data of these intermediate frames, and eventually outputs the image data of the intermediate frame n+K.

Rounding the phase of the intermediate frame n+K to an integer value, or completely rounding it to an integral phase, does not damage the intermediate frame video but loses the effect of improving the smoothness of a motion obtained after the frame rate conversion, as well as a cinema smoothing effect. For this reason, bringing the phase of the intermediate frame n+K close to the integral phase is preferably adjusted in accordance with the characteristics of a displayed image. The characteristics of the video can be information on (1) whether the video is of a film material or not, and (2) whether an OSD (On-Screen Display) is displayed or not. The film material here means a video signal or the like of a film having images recorded at 24 frames per second or 20 frames per second.

The OSD here is an example of information according to the present invention on whether character information is displayed or not. The character information may be not only OSD information (e.g., a user menu, etc.) synthesized in the video processing apparatus, but also OSD information (e.g., a user menu, a list of recorded programs, recording reservation information, etc. of a recorder) generated in a connected apparatus connected to the video processing apparatus, character information superimposed beforehand in a video signal (e.g., score information in a sports program, lyrics in a music program, subtitles in a movie, etc.), a logo of a broadcasting station, display of a menu recorded on a recording medium (e.g., chapter selection information, audio switching information etc. that are recorded on a DVD), and emergency information (e.g., earthquake information, breaking news, etc.). In other words, the character information collectively means character information that has a certain size (dimension) and is statically displayed on a screen in addition to a moving person or object.

Phase control according to the present invention can precisely display the static character information with less blurry characters. However, the present invention can be applied not only to such an example but also telop, for example, that moves in a certain direction. In accordance with these characteristics, the corrected interpolation phase coefficient Km is defined and multiplied by the motion vector V, and thus obtained multiplication value is used for projecting relevant pixels of the input frame image, to generate the image frame image.

Figure 3:
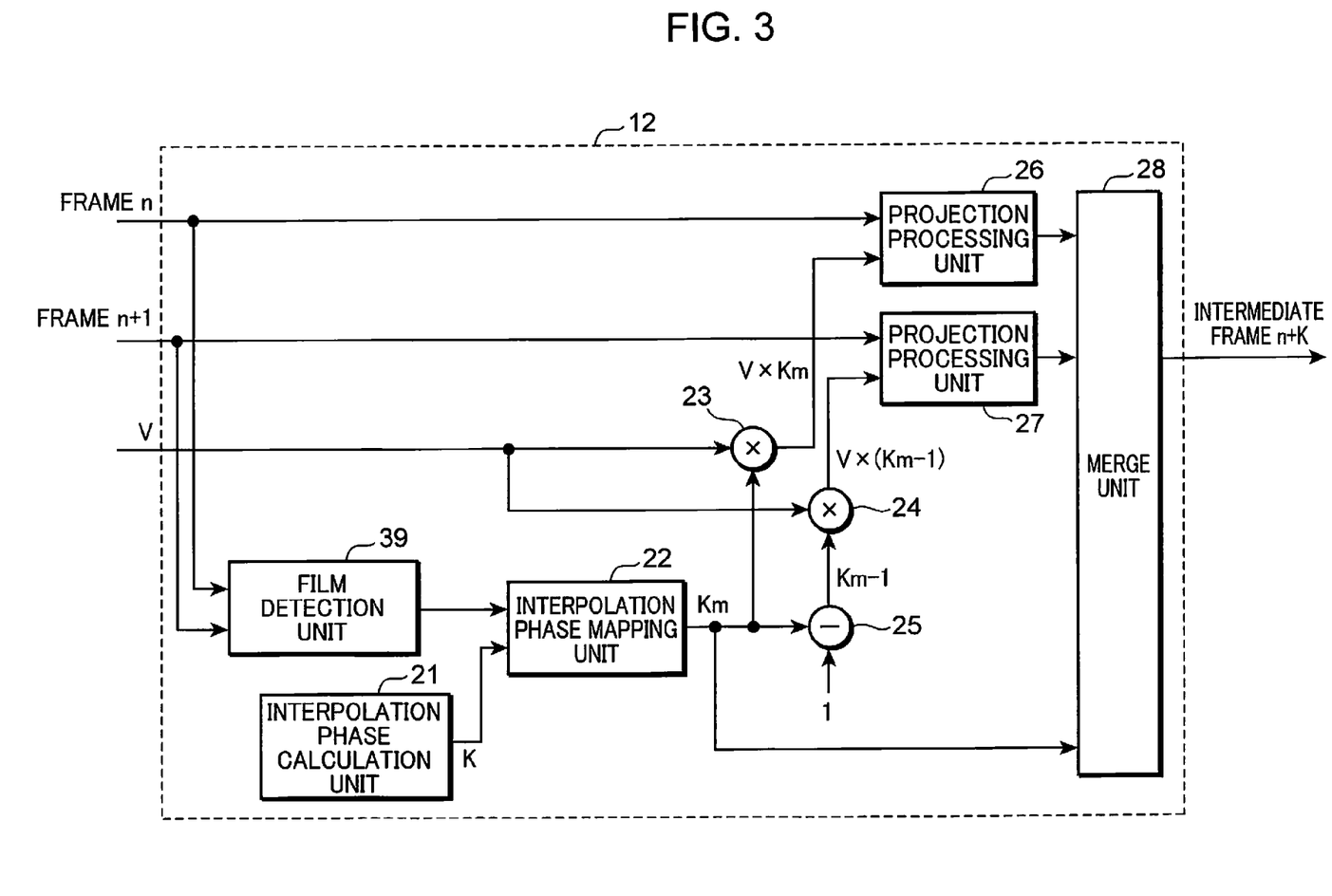
FIG. 3 is a block diagram showing the configuration of the motion vector processing unit shown in FIG. 1 in which a film detection unit is used.

Control that is performed based on (1) whether the video is of a film material or not, is specifically described. FIG. 3 is a block diagram showing a configuration of the vector processing unit 12 in which the video characteristic detection unit 29 shown in FIG. 2 is used as a film detection unit 39. When a film video originally having 24-Hz frequency is converted to a 60-Hz or 50-Hz television video signal, a conventional 3-2 pulldown process or 2-2 pulldown process is performed to overlap the same frames.

In recent years, a 24-Hz video signal is output directly from a reproducing device in order to faithfully reproduce a film material. In any case, unlike a normal video signal, there are less frames per unit time, which deteriorates the accuracy of motion vector information. In addition, a lot of frames need to be generated from a small number of frames, making a damage in an intermediate frame video obvious due to an error in detecting a motion vector. Therefore when an input image is of a film material, compared with when an input image is not of a film material, obscuring the damage can reduce visual discomfort by bringing the interpolation phase close to the integral phase.

The film detection unit 39 shown in FIG. 3 receives an input of the video signals of the input frames n, n+1, determines whether the input video signals are of a film material, based on the frame frequencies of the two video signals and a cycle for generating a difference between the two video signals, and notifies the interpolation phase mapping unit 22 of the determination result. This film determination process itself corresponds to a well-known technology, so the description thereof is omitted.

For example, when the input frame frequency is 24 Hz and the output frame frequency is 60 Hz, the interpolation phase calculation unit 21 first performs interpolation phase calculation in the motion vector processing unit 12. Specifically, the result of the calculation of input frame frequency/output frame frequency (=24/60=0.4) is added for each process, and the fractional portion of each result is obtained as the logical interpolation phase coefficient K.

Here, the value 0.4 is added sequentially to an initial value 0 and so on to obtain the results 0.0, 0.4, 0.8, 1.2, 1.6, 2.0, . . . and the like. The interpolation phase coefficients K obtained as the fractional portions of these results are 0.0, 0.4, 0.8, 0.2, 0.6, 0.0, and these five patterns are repeated.

The interpolation phase mapping unit 22 then generates an interpolation phase coefficient Km after mapping, such that each of the logical interpolation phase coefficients K is far from 0.5. For instance, in a method of calculating the interpolation phase coefficient Km after mapping, where $\alpha$ is a conversion coefficient, Km=K×$\alpha$ is computed where K≦0.5, and Km=1−(1−K)×$\alpha$=1−$\alpha$+K×$\alpha$ is computed where K>0.5. As is clear from these equations, the distance from 0.5 can be made variable, with the value of $\alpha$ as a parameter.

The conversion coefficient $\alpha$ is a parameter determined as a result of detection performed by the film detection unit 39. For example, when the input video signals are of a film material, the value of $\alpha$ is smaller than when the input video signals are not of a film material, and is set such that the interpolation phase approaches an original image phase (phase of the input frame image). In TV broadcasting, because a state where a video signal is of a film material and a state where the video signal is not of a film material frequently alternate with each other, the value of $\alpha$ does not have to be a binary value and preferably transits in multiple steps upon change in state.

Figure 4:
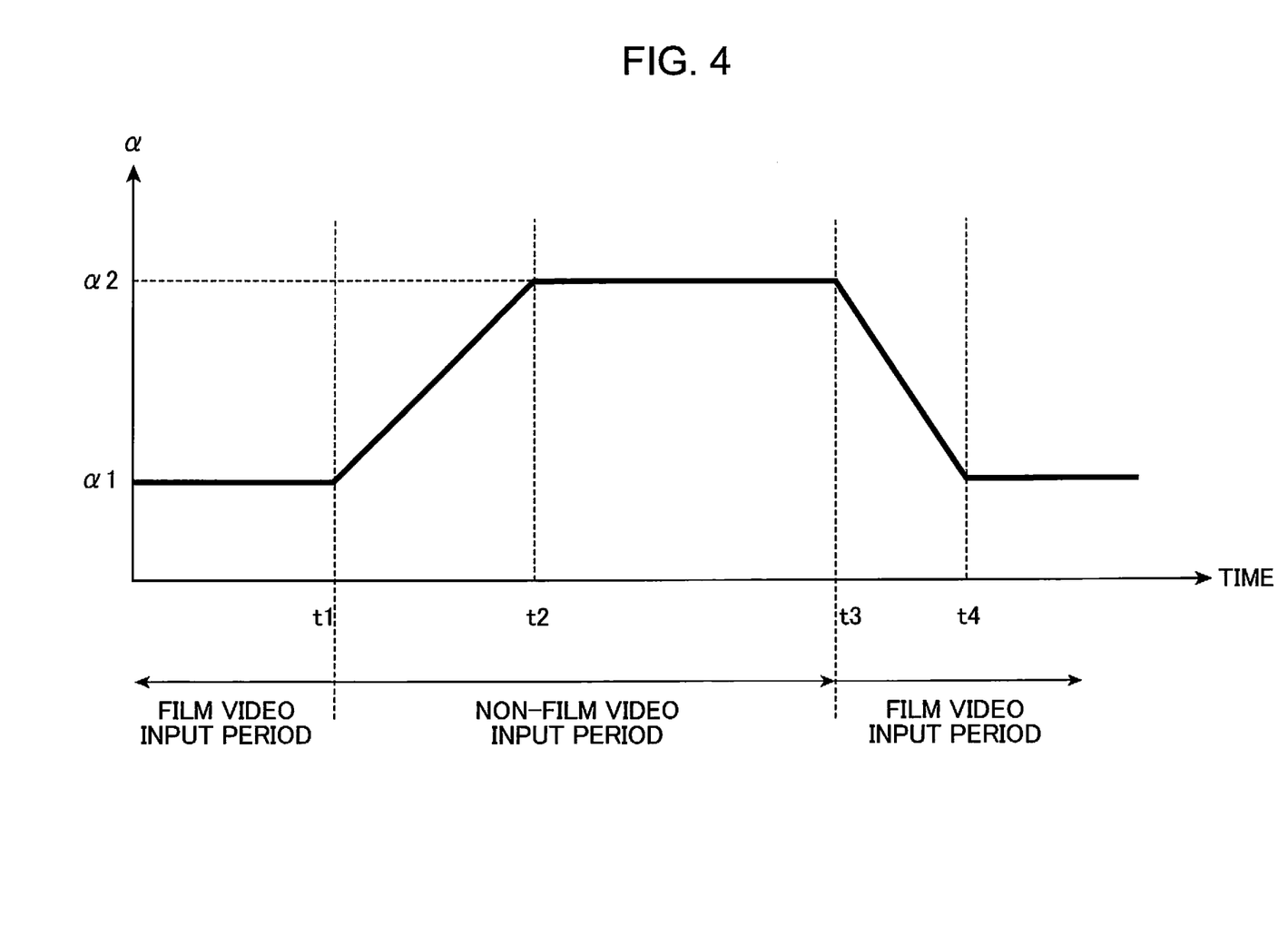
FIG. 4 is a diagram showing a relationship between a film detection result and an α value.

FIG. 4 shows an example of a relationship between a film detection result and the conversion coefficient $\alpha$. In FIG. 4, the time periods prior to a time t1 and subsequent to a time t3 represent input periods during which the video signals of a film material are input, and the time period between the time t1 and the time t3 represents an input period during which a video signal of a non-film material is input. Generally, a film detection process involves a delay in the detection, but such delay is not taken into consideration herein, for sake of simplicity.

A value $\alpha$1, which is the value of $\alpha$ obtained prior to the time t1, is relatively small. Therefore, the value of Km where K≦0.5 is also small, but the value of Km where K>0.5 is large. An intermediate frame image that is generated using this Km is generated in a position that is relatively close to the original image phase. When the input video signal changes from a film video to a non-film video at the time t1, the film detection unit 39 detects this timing t1 and notifies the interpolation phase mapping unit 22 of the detection result.

When, at the time t1, $\alpha$1 is switched to $\alpha$2 ($\alpha$1<$\alpha$2), which is the value of $\alpha$ used in the case of the non-film video, the quality or phase of the intermediate frame image to be generated changes drastically, causing great visual discomfort. Therefore, in FIG. 4 it is desirable that the value of $\alpha$ be changed from $\alpha$1 to $\alpha$2 slowly over a predetermined period of time from the time t1 to the time t2. As a result, the interpolation phase mapping unit 22 increases the value of $\alpha$ from $\alpha$1 to $\alpha$2 slowly and linearly over time from the time t1 to the time t2.

Similarly, at the time t3 at which the input signal is changed from the non-film video to the film video, the value of $\alpha$ is preferably changed slowly from $\alpha$2 to $\alpha$1 after a time period between the time t3 and a time t4. Therefore, the film detection unit 39 detects the timing t3 at which the input signal changes from the non-film video to the film video, and notifies the interpolation phase mapping unit 22 of the detection result. The interpolation phase mapping unit 22 reduces the value of $\alpha$ from $\alpha$2 to $\alpha$1 slowly and linearly over time from the time t3 to the time t4. Note that the time period between the time t1 and the time t2 is not necessarily the same as the time period between the time t3 and the time t4. Furthermore, the value of $\alpha$2 does not always have to be 1.

Figure 5:
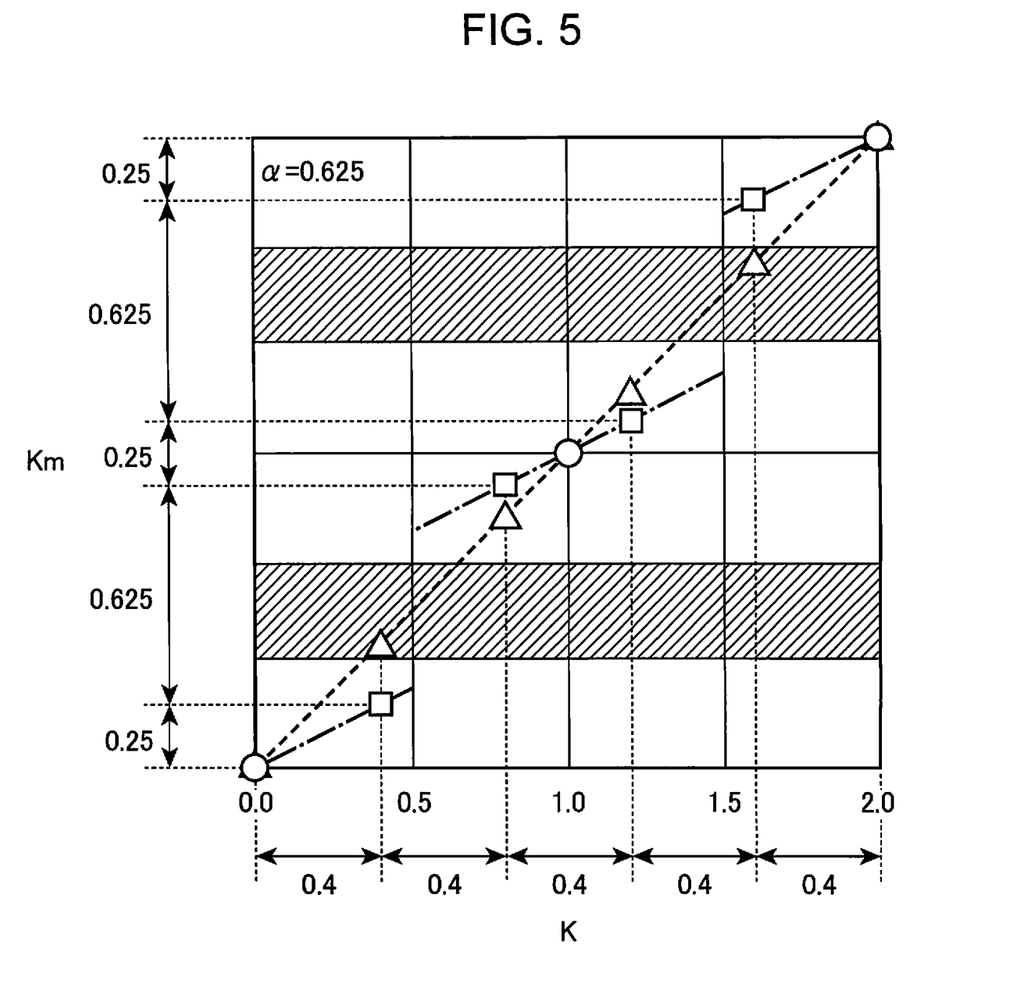
FIG. 5 is an interpolation phase comparison diagram obtained when α=0.625.

FIG. 5 shows an example where $\alpha$=0.625. FIG. 5 is an interpolation phase comparison diagram obtained when $\alpha$=0.625. As described above, the patterns are repeated when the interpolation phase is 2.0 or above, the description of the interpolation phase is omitted in FIG. 5. For the purpose of facilitating visual understanding, the interpolation phases (phase ranges around 0.5) in an intermediate distance where damages are easily detected, are hatched in the diagram.

The circle marks ○ shown in FIG. 5 represent the phases of the input frames, the triangles Δ represent the phases of conventional output frame (intermediate frame), and the squares □ represent the output frame (intermediate frame) of the present embodiment. Intervals of the fractional portions=K of the logical interpolation phases (logical interpolation phases that are determined from the phase intervals obtained by dividing the input frame frequencies by the output frame frequencies) are shown in the horizontal axis of FIG. 5. Intervals of the fractional portions=Km of the corrected interpolation phases of the present embodiment are shown in the vertical axis.

The logical interpolation coefficient K of the output frames shown in the diagram indicate an equal interval of 0.4, whereas the interpolation phase coefficients Km of the present embodiment obtained after mapping indicate unequal intervals of 0.25, 0.625, 0.25, 0.625, and 0.25. The phases of the output frame are sequentially 0.0, 0.25, 0.875, 1.125, 1.75, 2.0 and so on, which are close to integer values, compared to the original interpolation phases 0.0, 0.4, 0.8, 1.2, 1.6, 2.0 and so on. By bringing the interpolation phase coefficients Km close to the integer values as above, the phases of the time axis of the intermediate frames to be generated can approach the phases of the time axis of the input frames.

The hatched areas shown in the diagram are the areas where damage to the intermediate frame video is detected easily. Although the phases Δ of the conventional output frame (intermediate frame) exist in these hatched areas, the phases □ of the output frame (intermediate frame) of the present embodiment exist outside the hatched areas, meaning that damage to the intermediate frame video cannot be detected easily in the present embodiment.

According to the explanation above, the value of $\alpha$ is changed linearly, but the characteristics of this change are not particularly limited to the linear characteristics, and are set beforehand based on a functional research as described above. Hence, complicated characteristics of a quadratic function, cubic or higher function, exponent function, multivariable function, or a combination thereof may be used. In the present embodiment, the amount of the conversion coefficient $\alpha$ is changed depending on whether the input video signals are originally of a film material or not, but the interpolation phase coefficients Km obtained after conversion may be calculated depending on other characteristics such as, for example, whether an OSD or telop is included in the input video signals or not. In this case as well, suitable effects are accomplished. Moreover, the computational technique of the interpolation phase mapping unit 22 is not particularly limited to the linear computation described above, and various computational techniques can be used.

Figure 6:
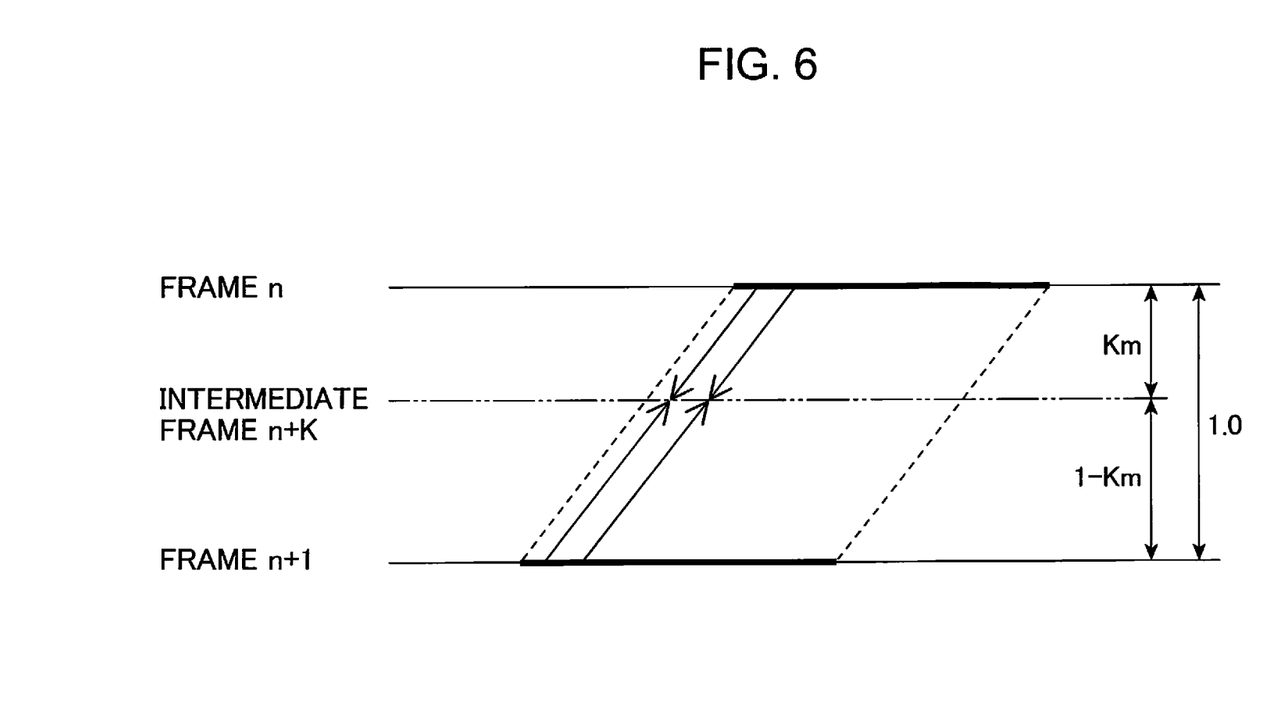
FIG. 6 is a diagram schematically showing a projection process for generating image data of an intermediate frame n+K from image data of an input frame n or image data of an input frame n+1.

FIG. 6 is a diagram schematically showing the projection process for generating the image data of the intermediate frame n+K from the image data of the input frame n or the image data of the input frame n+1. As shown in FIG. 6, the motion vector V detected by the motion vector detection unit 1 applies when the inter-frame distance is 1.0. Thus, when performing the projection process to generate the image data of the intermediate frame n+K from the image data of the input frame n, it is necessary to perform a gain process of multiplying the motion vector V by the corrected interpolation phase coefficients Km. Similarly, when performing the projection process to generate the image data of the intermediate frame n+K from the image data of the input frame n+1, it is necessary to perform a gain process of multiplying the motion vector V by −(1−Km)=Km−1. The symbols change in this case because the images are projected in a direction of going against the time from the input frame n+1.

As described above, the projection processing unit 26 performs the projection process on the image data of the input frame n by using V×Km, to generate the image data of the intermediate frame. The projection processing unit 27 performs the projection process on the image data of the input frame n+1 by using V×(Km−1), to generate the image data of the intermediate frame. The merge unit 28 appropriately merges the image data of these intermediate frames and eventually output the image data of the intermediate frame n+K at an output frame frequency of 60 Hz as the image data of the output frame. Note that various well-known methods can be used as the method of creating the intermediate frame image that is used by the projection processing units 26, 27 and the merge unit 28, thus the detailed descriptions thereof are omitted.

The video processing apparatus having the configurations described is used to evaluate how the cinema smoothing effect of the video signal of a film material is no longer observed after bringing the phases of the intermediate frame from the intermediate phase (0.5) to the integral phase. The evaluation values vary depending on various causes such as the degree of a motion in the image or the clarity of the image, and almost no cinema smoothing effect was observed when the intermediate phase (0.5) approached an integral phase of 0.25 or lower, or 0.75 or above. Therefore, it is preferred that the value of the conversion coefficient α be 0.5 or above.

Figure 7:
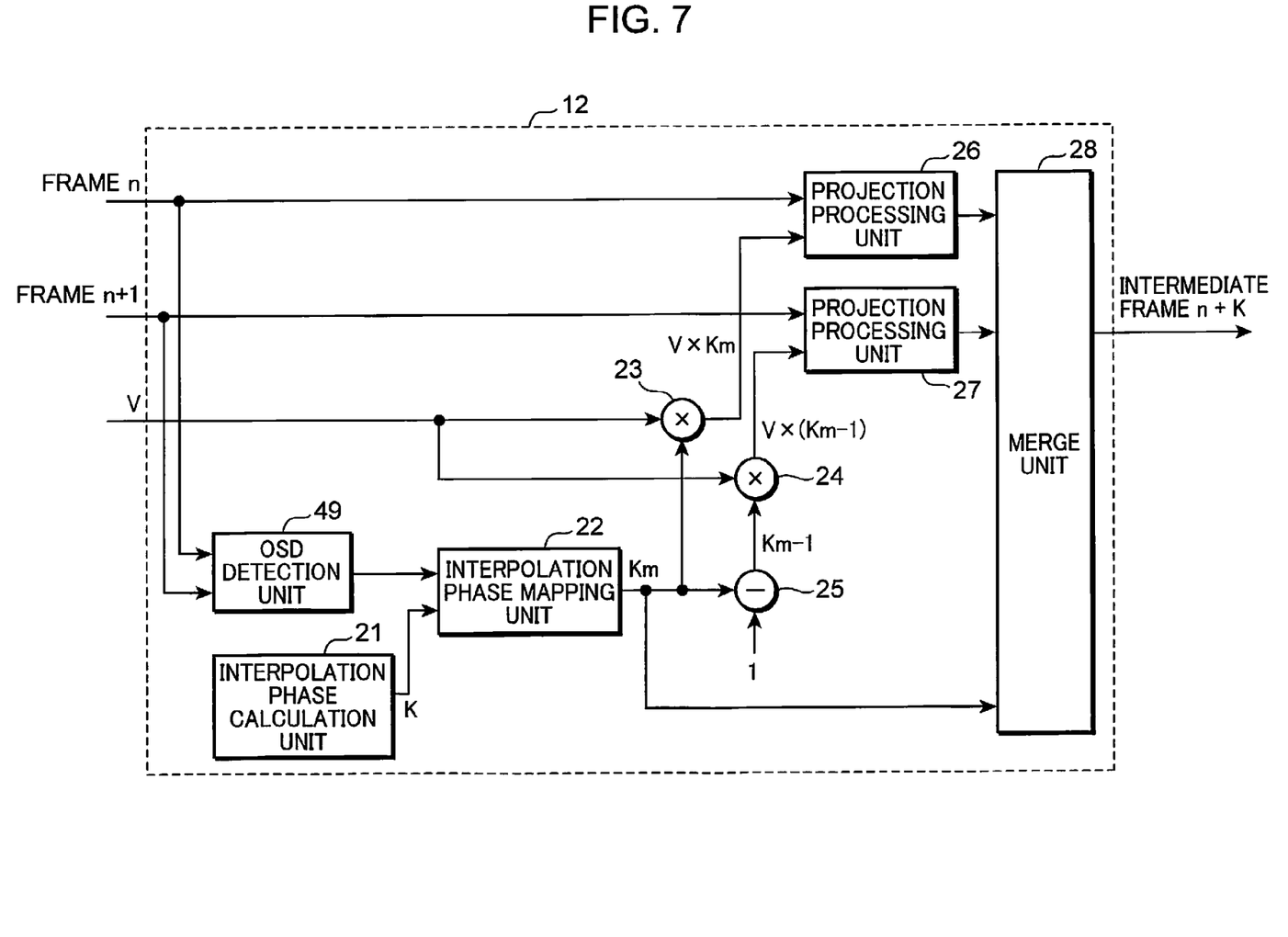
FIG. 7 is a block diagram showing a configuration of the motion vector processing unit shown in FIG. 1 that is performed using an OSD detection unit.

As shown in FIG. 7, the motion vector processing unit 12 has an OSD detection unit 49 and other characteristics of the video considered include the information on (2) whether an OSD is displayed or not. In a state of (2) where the OSD is displayed, it is desired that the value of α be set at a relatively low value in order to prevent an OSD section displayed as a static image from being damaged due to the motion vector information and consequently the visibility from lowering.

Control that is performed based on (2) whether an OSD is displayed or not, is specifically described. FIG. 7 is a block diagram showing a configuration of the vector processing unit 12 in which the video characteristic detection unit 29 shown in FIG. 2 is used as the OSD detection unit 49.

The OSD detection unit 49 shown in FIG. 7 receives an input of the video signals of the input frames n, n+1, determines from the two video signals whether the OSD is displayed or not, and notifies the interpolation phase mapping unit 22 of the determination result. This OSD determination process itself corresponds to a well-known technology, so the description thereof is omitted. In addition, because the processes subsequent to the process of determining the conversion coefficient α performed by the vector processing unit 12 shown in FIG. 7 are same as those performed by the vector processing unit 12 shown in FIG. 3, the descriptions thereof are omitted.

The conversion coefficient α is a parameter determined as a result of detection performed by the OSD detection unit 49. For example, when the OSD is displayed, the value of α is smaller than when the OSD is not displayed, and is set such that the interpolation phase approaches the original image phase (phase of the input frame image). In TV broadcasting, because a state where the OSD is displayed and a state where the OSD is not displayed frequently alternate with each other, the value of α does not have to be a binary value and preferably transits in multiple steps upon change in state. As with FIG. 4, for example, the followings are obtained when the time periods prior to the time t1 and subsequent to the time t3 represent video signal input periods during which the OSD is displayed, and the time period between the time t1 and the time t3 represents a video signal input period during which the OSD is not displayed.

First of all, the value α1, which is the value of α obtained prior to the time t1, is relatively small. Therefore, the value of Km where K≦0.5 is also small, but the value of Km where K>0.5 is large. The intermediate frame image that is generated using this Km is generated in a position that is relatively close to the original image phase. When the input video signal changes, at the time t1, from the video signal in which the OSD is displayed, to the video signal in which the OSD is not displayed, the OSD detection unit 49 detects this timing t1 and notifies the interpolation phase mapping unit 22 of the detection result.

When, at the time t1, α1 is switched to α2(α1<α2), which is the value of α used when the OSD is not displayed, the quality or phase of the intermediate frame image to be generated changes drastically, causing great visual discomfort. Therefore, as with FIG. 4, it is desirable that the value of α be changed from α1 to α2 slowly over a predetermined period of time from, for example, the time t1 to the time t2. As a result, the interpolation phase mapping unit 22 increases the value of α from α1 to α2 slowly and linearly over time from the time t1 to the time t2.

Similarly, at the time t3 at which the input signal is changed from the video signal where the OSD is not displayed to the video signal where the OSD is displayed, the value of α is preferably changed from α2 to α1 after the time period between the time t3 and a time t4. Therefore, the OSD detection unit 49 detects the timing t3 at which the input signal changes from the video signal where the OSD is not displayed to the video signal where the OSD is displayed, and notifies the interpolation phase mapping unit 22 of the detection result. The interpolation phase mapping unit 22 reduces the value of α from α2 to α1 slowly and linearly over time from the time t3 to the time t4. Note that the time period between the time t1 and the time t2 is not necessarily the same as the time period between the time t3 and the time t4. Furthermore, the value of α2 does not always have to be 1.

As described above, in the present embodiment, when performing the frame rate conversion process for converting the 60-Hz input video signal into the 120-Hz video signal and output, or when performing the cinema video dejudder process where a so-called cinema video originally having a 24-Hz frame frequency is pulled down into the 60-Hz video signal input, which is then converted into a video having 120-Hz or 60-Hz output frame frequency, the temporally successive two input frame images are used for detecting a motion vector, and the logical interpolation phase coefficient K is generated from the logical interpolation phase that is determined from the phase interval obtained by dividing the input frame frequency by the output frame frequency. The generated interpolation phase coefficient K is converted into the interpolation phase coefficient Km by using the conversion coefficient α that is determined in accordance with the characteristics of the input video signals. The input frame images are subjected to the projection process by using the detected motion vector V and the interpolation phase coefficient Km obtained after the conversion, whereby the intermediate frame image is generated. As a result, the phase of the intermediate frame image can be a phase close to an integer different from the interpolation phase. Therefore, the user cannot easily detect a damage in the intermediate frame image generated as the output frame image, preventing the intermediate frame video from being damaged after the frame rate conversion with simple configurations.

The recent liquid crystal televisions have display frequencies of 120 Hz, 240 Hz and the like instead of 60 Hz. Clearly, the present invention can be applied to these display frequencies as well.

The summary of the present invention based on these embodiments is described hereinafter. In other words, the video processing apparatus according to the present invention is a video processing apparatus for converting frame rates of video signals, having: a characteristic detection unit that detects, from an input video signal, as characteristics of the video signal, whether or not the video signal is of a film material and/or whether or not character information is displayed in the video signal; and an image generation unit that uses the characteristics detected by the characteristic detection unit, to generate an intermediate frame image having a phase different from a phase of the input frame image of the video signal, wherein, in accordance with the characteristics detected by the characteristic detection unit, the image generation unit moves the phase of the intermediate frame image to a phase different from a logical interpolation phase determined based on an input frame frequency and an output frame frequency.

In this video processing apparatus, whether or not the video signal is of a film material and/or whether or not character information is displayed in the video signal, is detected as the characteristics of the video signal, and the detected characteristics are used to generate the intermediate frame image having a phase different from that of the input frame image. At this moment, the phase of the intermediate frame image is moved to a phase different from the logical interpolation phase determined based on the input frame frequency and the output frame frequency, in accordance with the detected characteristics. Consequently, the phase of the intermediate frame image becomes a phase close to an integer different from the interpolation phase. As a result, in the video processing apparatus of the present invention, damage in the intermediate frame image generated as the output frame image cannot easily be detected by the user, preventing the intermediate frame video from being damaged after the conversion with simple configurations.

It is preferred that the video processing apparatus described above further have a motion amount detection unit that detects a motion amount of an image by using at least two or more temporally successive input frame images of the video signal, wherein the image generation unit has: a coefficient generation unit that generates a logical interpolation phase coefficient from the logical interpolation phase that is determined from a phase interval obtained by dividing the input frame frequency by the output frame frequency; a coefficient correction unit that corrects the logical interpolation phase coefficient generated by the coefficient generation unit, in accordance with the characteristics detected by the characteristic detection unit; and a generation unit that generates, from the input frame image, an intermediate frame image having a phase different from the interpolation phase, by using the motion amount detected by the motion amount detection unit and the interpolation phase coefficient corrected by the coefficient correction unit.

In this case, when converting frame rates of video signals, the motion amount of the image is detected using at least two or more temporally successive input frame images, and the logical interpolation phase coefficient is generated from the logical interpolation phase that is determined from a phase interval obtained by dividing the input frame frequency by the output frame frequency. In accordance with the detected characteristics, the generated logical interpolation phase coefficient is corrected, and the intermediate frame image having a phase different from the logical interpolation phase is generated from the input frame image by using the detected motion amount and the corrected interpolation phase coefficient. Because the phase of the intermediate frame image can be a phase close to an integer different from the logical interpolation phase by correcting the logical interpolation phase coefficient in accordance with the detected characteristics, damage in the intermediate frame image generated as the output frame image cannot easily be detected by the user, preventing the intermediate frame video from being damaged after frame rate conversion is performed with simple configurations.

It is preferred that the coefficient correction unit correct the logical interpolation phase coefficient in accordance with the characteristics detected by the characteristic detection unit, such that the phase of the intermediate frame image approaches the phase of the input frame image.

In this case, because the logical interpolation phase coefficient is corrected in accordance with the characteristics detected by the characteristic detection unit, such that the phase of the intermediate frame image approaches the phase of the input frame image, the phase of the intermediate frame image can approach the phase of the input frame image or a phase near an integer.

When the characteristic detection unit detects that the video signal is of a film material or that character information is displayed in the video signal, it is preferred that the coefficient correction unit correct the logical interpolation phase coefficient such that the phase of the intermediate frame image approaches the phase of the input frame image.

In this case, when it is detected that the video signal is of a film material or when it is detected that the character information is displayed in the video signal, the logical interpolation phase coefficient is corrected such that the phase of the intermediate frame image approaches the phase of the input frame image. Therefore, when the video signal is of a film material or when the character information is displayed in the video signal, the phase of the intermediate frame image can approach the phase of the input frame image or a phase near an integer. As a result, when the video signal is of a film material or even when the character information is displayed in the video signal, damage in the intermediate frame image generated as the output frame image cannot be detected easily by the user, securely, and preventing the intermediate frame video from being damaged with simple configurations.

It is preferred that the characteristic detection unit detect timing at which the video signal is switched from a non-film material to a film material, and that the coefficient correction unit correct the logical interpolation phase coefficient such that the phase of the intermediate frame image sequentially approaches the phase of the input frame image with the passing of time since the switching timing.

In this case, the logical interpolation phase coefficient is corrected such that the phase of the intermediate frame image sequentially approaches the phase of the video input frame image with the passing of time since the switching timing at which the video signal is switched from the non-film material to a film material. Therefore, even when the state where the video signal is not of a film material is frequently changed to the state where the video signal is of a film material, the quality or phase of the intermediate frame image to be generated does not change drastically, preventing the occurrence of visual discomfort.

It is preferred that the characteristic detection unit detect timing at which the video signal is switched from a film material to a non-film material, and that the coefficient correction unit correct the logical interpolation phase coefficient such that the phase of the intermediate frame image sequentially moves away from the phase of the input frame image with the passing of time since the switching timing.

In this case, the logical interpolation phase coefficient is corrected such that the phase of the intermediate frame image sequentially moves away the phase of the video input frame image with the passing of time since the switching timing at which the video signal is switched from a film material to a non-film material. Therefore, even when the state where the video signal is of a film material is frequently changed to the state where the video signal is not of a film material, the quality or phase of the intermediate frame image to be generated does not change drastically, preventing the occurrence of visual discomfort.

It is preferred that the characteristic detection unit detect timing at which a video signal in which the character information is not displayed is switched to a video signal in which the character information is displayed, and that the coefficient correction unit correct the logical interpolation phase coefficient such that the phase of the intermediate frame image sequentially approaches the phase of the input frame image with the passing of time since the switching timing.

In this case, the logical interpolation phase coefficient is corrected such that the phase of the intermediate frame image sequentially approaches the phase of the input frame image with the passing of time since the switching timing at which a video signal in which the character information is not displayed is switched to a video signal in which the character information is displayed. Therefore, even when the video signal in which the character information is displayed is frequently switched to the video signal in which the character information is not displayed, the quality or phase of the intermediate frame image to be generated does not change drastically, preventing the occurrence of visual discomfort.

It is preferred that the characteristic detection unit detect timing at which a video signal in which the character information is displayed is switched to a video signal in which the character information is not displayed, and that the coefficient correction unit correct the logical interpolation phase coefficient such that the phase of the intermediate frame image sequentially moves away from the phase of the input frame image with the passing of time since the switching timing.

In this case, the logical interpolation phase coefficient is corrected such that the phase of the intermediate frame image sequentially moves away from the phase of the input frame image with the passing of time since the switching timing at which a video signal in which the character information is displayed is switched to a video signal in which the character information is not displayed. Therefore, even when the video signal in which the character information is displayed is frequently switched to the video signal in which the character information is not displayed, the quality or phase of the intermediate frame image to be generated does not change drastically, preventing the occurrence of visual discomfort.

The video processing method according to the present invention is a video processing method for converting frame rates of video signals, having: a first step of detecting, from an input video signal, as characteristics of the video signal, whether or not the video signal is of a film material and/or whether or not character information is displayed in the video signal; and a second step of generating an intermediate frame image having a phase different from a phase of an input frame image of the video signal, by using the characteristics detected in the first step, wherein in the second step, in accordance with the characteristics detected in the first step, the phase of the intermediate frame image is moved to a phase different from a logical interpolation phase determined based on an input frame frequency and an output frame frequency.

INDUSTRIAL APPLICABILITY

The video processing apparatus according to the present invention can use simple configurations to prevent damage to an intermediate frame video obtained after frame rate conversion. Therefore, the video processing apparatus according to the present invention is helpful as a video processing apparatus that performs a cinema video dejudder process.

The invention claimed is:

1. A video processing apparatus for converting frame rates of video signals, comprising:
   a characteristic detection unit that detects, from an input video signal, as characteristics of the video signal, whether or not character information is displayed in the video signal;
   an image generation unit that uses the characteristics detected by the characteristic detection unit to generate an intermediate frame image having a phase different from a phase of an input frame image of the video signal; and
   a motion amount detection unit that detects a motion amount of an image by using at least two or more temporally successive input frame images of the video signal,
   wherein, in accordance with the characteristics detected by the characteristic detection unit, the image generation unit moves the phase of the intermediate frame image to a phase different from a logical interpolation phase determined based on an input frame frequency and an output frame frequency,
   wherein the image generation unit has:
   a coefficient generation unit that generates a logical interpolation phase coefficient from the logical interpolation phase that is determined from a phase interval obtained by dividing the input frame frequency by the output frame frequency;
   a coefficient correction unit that corrects the logical interpolation phase coefficient generated by the coefficient generation unit, in accordance with the characteristics detected by the characteristic detection unit; and
   a generation unit that generates, from the input frame image, the intermediate frame image having a phase different from the logical interpolation phase, by using the motion amount detected by the motion amount detection unit and the logical interpolation phase coefficient corrected by the coefficient correction unit.

2. The video processing apparatus according to claim 1, wherein the coefficient correction unit corrects the logical interpolation phase coefficient in accordance with the characteristics detected by the characteristic detection unit, such that the phase of the intermediate frame image approaches the phase of the input frame image.

3. The video processing apparatus according to claim 2, wherein when the characteristic detection unit detects that character information is displayed in the video signal, the coefficient correction unit corrects the logical interpolation phase coefficient such that the phase of the intermediate frame image approaches the phase of the input frame image.

4. The video processing apparatus according to claim 1, wherein the characteristic detection unit detects timing at which a video signal in which the character information is not displayed is switched to a video signal in which the character information is displayed, and the coefficient correction unit corrects the logical interpolation phase coefficient such that the phase of the intermediate frame image sequentially approaches the phase of the input frame image with the passing of time since the switching timing.

5. The video processing apparatus according to claim 1, wherein the characteristic detection unit detects timing at which a video signal in which the character information is displayed is switched to a video signal in which the character information is not displayed, and the coefficient correction unit corrects the logical interpolation phase coefficient such that the phase of the intermediate frame image sequentially moves away from the phase of the input frame image with the passing of time since the switching timing.

6. A video processing apparatus for converting frame rates of video signals, comprising:

a characteristic detection unit that detects, from an input video signal, as characteristics of the video signal, whether or not the video signal is of a film material;

an image generation unit that uses the characteristics detected by the characteristic detection unit, to generate an intermediate frame image having a phase different from a phase of an input frame image of the video signal; and a motion amount detection unit that detects a motion amount of an image by using at least two or more temporally successive input frame images of the video signal, wherein, in accordance with the characteristics detected by the characteristic detection unit, the image generation unit moves the phase of the intermediate frame image to a phase different from a logical interpolation phase determined based on an input frame frequency and an output frame frequency, wherein the image generation unit has:

a coefficient generation unit that generates a logical interpolation phase coefficient from the logical interpolation phase that is determined from a phase interval obtained by dividing the input frame frequency by the output frame frequency;

a coefficient correction unit that corrects the logical interpolation phase coefficient generated by the coefficient generation unit, in accordance with the characteristics detected by the characteristic detection unit; and a generation unit that generates, from the input frame image, the intermediate frame image having a phase different from the logical interpolation phase, by using the motion amount detected by the motion amount detection unit and the logical interpolation phase coefficient corrected by the coefficient correction unit.

7. The video processing apparatus according to claim 6, wherein the coefficient correction unit corrects the logical interpolation phase coefficient in accordance with the characteristics detected by the characteristic detection unit, such that the phase of the intermediate frame image approaches the phase of the input frame image.

8. The video processing apparatus according to claim 7, wherein when the characteristic detection unit detects that the video signal is of a film material, the coefficient correction unit corrects the logical interpolation phase coefficient such that the phase of the intermediate frame image approaches the phase of the input frame image.

9. The video processing apparatus according to claim 6, wherein the characteristic detection unit detects timing at which the video signal is switched from a non-film material to a film material, and the coefficient correction unit corrects the logical interpolation phase coefficient such that the phase of the intermediate frame image sequentially approaches the phase of the input frame image with the passing of time since the switching timing.

10. The video processing apparatus according to claim 6, wherein the characteristic detection unit detects timing at which the video signal is switched from a film material to a non-film material, and the coefficient correction unit corrects the logical interpolation phase coefficient such that the phase of the intermediate frame image sequentially moves away from the phase of the input frame image with the passing of time since the switching timing.

* * * * *